(No Model.)
T. R. BARNEY.
IMPLEMENT FOR MEASURING AND WEIGHING POWDER CHARGES.
No. 561,754. Patented June 9, 1896.
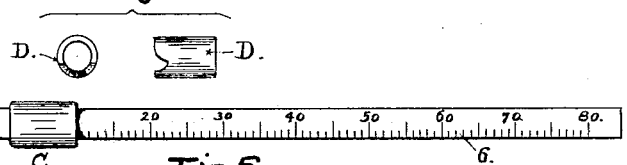
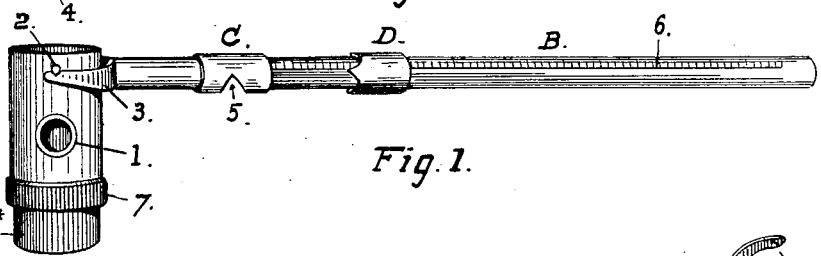
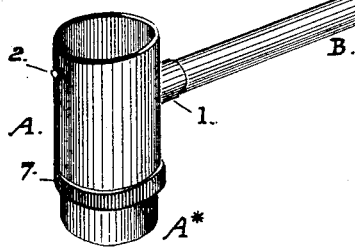
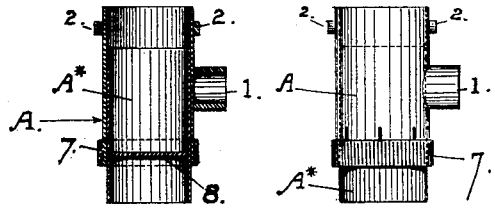
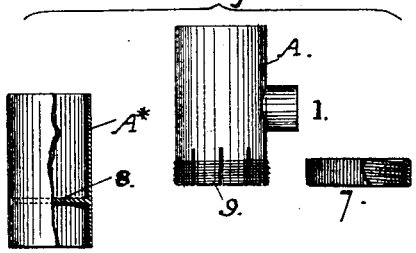
Witnesses:
E. Putten
M. Regner
Inventor:
Thomas R. Barney
By Smith & Osborn
attys.

UNITED STATES PATENT OFFICE.

THOMAS R. BARNEY, OF SAN FRANCISCO, CALIFORNIA.

IMPLEMENT FOR MEASURING AND WEIGHING POWDER CHARGES.

SPECIFICATION forming part of Letters Patent No. 561,754, dated June 9, 1896.

Application filed March 14, 1896. Serial No. 583,221. (No model.)

*To all whom it may concern:*

Be it known that I, THOMAS R. BARNEY, a citizen of the United States, residing in the city and county of San Francisco and State of California, have invented certain new and useful Improvements in Implements for Weighing and Measuring Charges of Powder, of which the following is a specification.

This invention relates to the production of a simple and convenient device or implement principally for the use of sportsmen and others to measure out charges of what is known as "nitro-powders," in which the quantity to be used for a charge is based on the weight.

It has for its object, mainly, to provide a ready means of determining the required bulk or quantity by measure for a charge containing a given number of grains, whereby charges or loads based on the strength of the grade or brand of the powder used and designated by weight in grains can be measured out with exactness.

To such end and object my invention consists in a novel construction of parts and in the combination thereof producing an implement that embraces in its structure a weighing device and a measuring device, as hereinafter fully explained and set forth, reference being had in this specification to the accompanying drawings, that form a part thereof.

Figure 1 of the drawings represents the said implement in side view as it appears when ready for weighing a charge of powder. Fig. 2 represents in perspective the implement ready for use in measuring out the charges after the measure has been adjusted to the required size. Fig. 3 is a side view of the adjustable measure or receptacle. Fig. 4 is a longitudinal section through Fig. 3. Fig. 5 shows in detail the parts composing the receptacle. Fig. 6 is a plan or top view of the beam or part that is combined with the powder-receptacle to form both a scale-beam and a handle. Fig. 7 shows in detail the sliding weight or pea of the scale-beam.

The parts of this instrument consist of a powder receptacle and measure of bulk or capacity A, a scale-beam B, which also forms a handle for the said measure, a fulcrum-point C on the said beam, and a sliding weight or pea D.

The measure consists of a body A, constructed of a cylindrical shell open at both ends, and a sliding cup or cylinder $A^\times$, divided into two receptacles by a solid diaphragm 8, located nearer to one end than to the other, so that one of the receptacles into which it is divided is considerably deeper than the other. The measure thus formed of the two parts $A\ A^\times$ is reduced or increased in depth by moving the part $A^\times$ in or out, and also by withdrawing it from the part A and inserting it again in reversed position, the two extremes of deepness and shallowness and any depth of measure between them being readily secured by reversing the inner tube and adjusting its position in the outer cylinder. The two parts $A\ A^\times$ may be held together and prevented from moving after adjustment in several ways, either by relying on the friction between the parts resulting from a close fit of the inner part $A^\times$ in the outer cylinder, or by employing a positive clamping or locking means, such as I have shown in Figs. 3, 4, and 5 of the drawings, which will be found both simple and effective and easily operated. On the lower end of the cylinder A is cut a screw-thread 9, and the body of the cylinder is slitted longitudinally from the edge upward at intervals around the circumference to receive a clamp-ring 7, which is threaded internally to fit over and work upon the threaded end of the cylinder. These parts are so fitted that by turning the ring 7 downward on the split end of the body the inner part $A^\times$ will be moved easily in or out; but by screwing the ring up the split end of the cylinder will be clamped upon the inner part. A slight turn of the ring is sufficient to tighten or to loosen the inner sliding section. The rod B, to one end of which this measure is attached, is made to serve both as a handle to the receptacle, whereby the same can be used after the manner of a dipper to take up and measure out charges of powder from the can or package in which it is kept, and also as a scale-beam, so that the quantity for the charge is readily weighed out and the capacity of the measure afterward adjusted to the desired quantity for the charge. For this last-mentioned purpose a scale of grain-divisions 6 is marked along the surface of the rod B and a sliding weight or pea D, formed of a ring or short section of tubing, is fitted to slide upon the rod B, and in addition to those a fulcrum-piece C is provided at a point near to that end of the rod to which the receptacle is attached. The V-shaped notch 5 is the under side of the part C, which forms a ready means of balancing the beam upon a convenient fulcrum or pivot—such, for example, as would be afforded by the open blade of a pocket-knife—and by placing the fulcrum-notch upon the edge of such a blade or a similar knife-edge the device is converted into a scale to ascertain the number of grains contained in the contents of the receptacle. These two functions of my device are performed separately, however, and when employed as a dipper and measure the receptacle should be attached to the handle in a rigid manner by a stiff connection in order to be manipulated to the best advantage; but when converted into a scale for weighing a charge such rigid or stiff union of the receptacle with the rod B has been found to interfere with the delicacy of the weighing operation and prevent the required degree of exactness from being secured. For these reasons I have made the handle B detachable from the receptacle A and have provided two styles or modes of connecting the receptacle and handle together, by one of which the handle is fixed rigidly to the receptacle, while in or by means of the other the receptacle is attached or suspended by pivots to swing freely from the end of the part B and retain an upright position under the movement of that part on the fulcrum-point 5. For this last-described connection of the parts, which is clearly shown in Fig. 1, one end of the rod is provided with the forks 3, having notches 4 4 on the top edge of the arms of the fork near the ends to take short pivots or pins 2 on the outside of the receptacle near the top, the fork being properly bent to let the receptacle swing freely on such supports 4. To attach the receptacle to the rod rigidly, the opposite end of the same rod is made to fit a socket 1 on the side of the receptacle, as shown in Fig. 2. The same rod B is thus made to serve for a handle and as a scale beam or lever.

In using this implement the size of the receptacle required to measure out a charge of a certain number of grains is first determined by drawing out the inner tube $A^\times$ to a greater or less distance and then placing the cup A in the fork 3 of the beam, which is then placed on a fulcrum, the weight D being set to the required point on the scale 6 distant from the fulcrum. A charge containing the desired number of grains being weighed in this manner, the size of the receptacle is regulated by moving the tube $A^\times$ upward in the cylinder A until the level of the contents is brought up to the top rim of the cylinder and the movable part is clamped or fixed to retain it in such position.

A measure of capacity based upon the weight of powder to be taken for a charge is thus obtained, and by dipping this measure into the body of powder and leveling off the top of the filled receptacle a number of shells are quickly and readily filled with charges, each containing the desired quantity.

Having thus fully described my invention, what I claim as new, and desire to secure by Letters Patent, is—

1. An implement for weighing and measuring charges of powder, comprising a cup or receptacle provided with a movable bottom, whereby the depth of such receptacle is regulated to produce a measure of required capacity; and a rod adapted to form a handle to said receptacle when used as a measure of bulk, and a beam or lever to said receptacle when used as a weighing device, said beam being provided with a fulcrum-point and a sliding weight, substantially as hereinbefore described.

2. The receptacle composed of the cylinder A the tube $A^\times$ having a bottom 8, and fitted into said cylinder to move in and out at the bottom thereof; in combination with the rod B adapted to serve both as a handle and as a scale beam or lever to such receptacle, means of detachably connecting the said rod to the receptacle, and a fulcrum-point and a sliding weight on said rod, substantially as described to operate as set forth.

3. The combination with the receptacle A having a vertically-adjustable bottom for regulating the depth and consequent capacity of the same, and provided with the pivots 2 2 and the socket 1; of the rod B having the scale 6 the sliding weight D and a fulcrum-point C and provided on one end with the fork 3 adapted to carry the said receptacle, the opposite end of said rod being fitted to the said socket on the receptacle, substantially as hereinbefore described.

4. The combination, of the cylinder A, the movable tube $A^\times$ having a closed partition 8 on the inside, and the clamping means consisting of the split lower end screw-threaded on the exterior surface and the clamping-ring fitted to said screw-threaded portion; the inner tube $A^\times$ adapted to slide in such outer cylinder, and the detachable rod B provided with the scale 6, the sliding weight and the fixed fulcrum-point and having on one end a fork to embrace and carry the cylinder A, and the other end adapted for inserting into a socket on the said cylinder.

In testimony that I claim the foregoing I have hereunto set my hand and seal.

THOMAS R. BARNEY. [L. S.]

Witnesses:
LEE D. CRAIG,
WALTER R. CRAIG.